US008651222B2

(12) United States Patent
Stenzenberger et al.

(10) Patent No.: US 8,651,222 B2
(45) Date of Patent: Feb. 18, 2014

(54) SUPPORT OF AN AXLE TRANSMISSION IN THE REAR REGION OF A PASSENGER VEHICLE

(71) Applicant: Bayerische Motoren Werke Aktiengesellschaft, Munich (DE)

(72) Inventors: Alfred Stenzenberger, Fuenfstetten (DE); Steffen Kuehlewind, Munich (DE); Norbert Wendland, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 13/940,995

(22) Filed: Jul. 12, 2013

(65) Prior Publication Data

US 2013/0292932 A1    Nov. 7, 2013

Related U.S. Application Data

(63) Continuation of application No. PCT/EP2011/071561, filed on Dec. 1, 2011.

(30) Foreign Application Priority Data

Jan. 14, 2011    (DE) .......................... 10 2011 002 700

(51) Int. Cl.
*B60K 17/00*    (2006.01)

(52) U.S. Cl.
USPC ........................... 180/374; 180/377; 280/782

(58) Field of Classification Search
USPC .................... 180/374, 377; 280/782, 124.109
See application file for complete search history.

(56) References Cited

U.S. PATENT DOCUMENTS

| 5,064,018 A | 11/1991 | Encke |
| 6,511,096 B1 * | 1/2003 | Kunert et al. ................. 280/785 |
| 6,516,914 B1 * | 2/2003 | Andersen et al. ............. 180/360 |

(Continued)

FOREIGN PATENT DOCUMENTS

| DE | 39 20 442 C1 | 1/1991 |
| DE | 40 32 378 A1 | 4/1992 |

(Continued)

OTHER PUBLICATIONS

Corresponding International Search Report with English Translation dated Jun. 18, 2012 (six (6) pages).
German Search Report with English Translation dated Nov. 29, 2011 (ten (10) pages).

*Primary Examiner* — Toan To
(74) *Attorney, Agent, or Firm* — Crowell & Moring LLP

(57) ABSTRACT

A support of an axle transmission in the rear region of a passenger vehicle on a rear axle carrier and on the floor panel structure of the vehicle body in a further connecting point with the interposition of elastic supports is provided. On the output side, the transmission is supported on the sole transverse member of the rear axle carrier, which includes two longitudinal members, and on the input side the transmission is fixed to the floor panel structure via a serial connection of two elastic supports with a mass body arranged therebetween. The transmission may be fixed to two connecting points on the floor panel structure, the connecting points lying next to each other substantially in the transverse direction. Two such serial connections of elastic supports may be provided with a common mass body with a weight ranging from 3 to 7 kilograms.

4 Claims, 2 Drawing Sheets

(56) References Cited

U.S. PATENT DOCUMENTS

| | | | |
|---|---|---|---|
| 6,631,914 B2 * | 10/2003 | Kawamura et al. | 280/124.107 |
| 7,850,181 B2 * | 12/2010 | Cordier | 280/124.109 |
| 7,946,377 B2 * | 5/2011 | Frasch et al. | 180/312 |
| 7,958,963 B2 * | 6/2011 | Hornisch et al. | 180/312 |
| 8,096,567 B2 * | 1/2012 | Cordier | 280/124.109 |
| 8,496,268 B2 * | 7/2013 | Theodore | 280/784 |
| 2005/0061573 A1 * | 3/2005 | Mizuno et al. | 180/376 |
| 2006/0058148 A1 * | 3/2006 | Miyazaki et al. | 475/200 |
| 2013/0168939 A1 * | 7/2013 | Buschjohann et al. | 280/124.109 |

FOREIGN PATENT DOCUMENTS

| | | |
|---|---|---|
| DE | 102 29 757 A1 | 1/2004 |
| DE | 10 2004 004 417 A1 | 8/2005 |
| DE | 10 2005 031 999 A1 | 1/2007 |
| DE | 10 2007 039 574 A1 | 2/2009 |
| EP | 0 170 220 A2 | 2/1986 |
| JP | 57-192641 A | 11/1982 |

* cited by examiner

SUPPORT OF AN AXLE TRANSMISSION IN THE REAR REGION OF A PASSENGER VEHICLE

CROSS REFERENCE TO RELATED APPLICATIONS

This application is a continuation of PCT International Application No. PCT/EP2011/071561, filed Dec. 1, 2011, which claims priority under 35 U.S.C. §119 from German Patent Application No. DE 10 2011 002 700.9, filed Jan. 14, 2011, the entire disclosures of which are herein expressly incorporated by reference.

BACKGROUND AND SUMMARY OF THE INVENTION

The invention concerns mounting a transmission in the rear region of a passenger vehicle, on one side on a rear axle carrier, and on the other side at an additional connecting point on the floor panel structure of the vehicle body with the interposition of elastic bearings. In regard to the prior art, reference is made to EP 0 170 220 A1 and DE 10 2004 004 417 A1.

In EP 0 170 220 A1 there is shown a semitrailing-arm axle's simple rear axle carrier consisting essentially only of a transverse member on which a transmission or a so-called differential housing is mounted. The mounting is by its input side while the output side of this transmission or differential housing, in whose area the drive shafts leading to the driven vehicle wheels are flange-mounted on the two transmission outputs, is fastened via an independent transmission carrier to the floor panel of the vehicle.

On passenger vehicles popular today with more complicated axle constructions, in particular comprising several (individual) wheel control arms per wheel, a transmission is, in so far as present, customarily elastically mounted at three points of an approximately rectangular, frame-shaped rear axle carrier to which most of the wheel control arms are fastened. The frame-shaped rear axle carrier is constructed of two longitudinal and two transverse members. Via this elastic mounting of the transmission in the rear axle carrier in connection with the also elastic mounting of the rear axle carrier on the floor panel structure of the vehicle body, vehicle body longitudinal members or the like introduced therein also counting as such, one avoids an undesirable introduction of high-frequency vibrations which come from the toothing of the transmission into the vehicle body. If on the contrary such high-frequency vibrations are imparted to the vehicle body, e.g. via a defective elastic bearing in the vehicle body, then these vibrations become noticeable as the dreaded "singing" of the transmission, where due to the vehicle body acting as a resonance body this sound becomes disturbingly audible to the occupants of the vehicle.

Basically, the last-described, current structure has proven itself but such an approximately rectangular, frame-shaped rear axle carrier requires a relatively large installation space and restricts the usable space in the area of the rear axle of a passenger vehicle.

To disclose a rear axle carrier more favorable relative to this and, adapted to such a more favorable rear axle carrier, an advantageous mounting of a transmission is the object of the present invention.

The achievement of this object is characterized in that the transmission is mounted on the output side on the sole transverse member of the rear axle carrier, which furthermore comprises two longitudinal members, and on the input side is fastened to the floor panel structure via a serial connection of two elastic bearings with a mass body lying therebetween. Preferably, the transmission is fastened to the floor panel structure at two connecting points which lie side-by-side essentially in the transverse direction of the vehicle, where for the connecting points two such serial connections of elastic bearings are provided with a common mass body. Preferably, the weight of the mass body ranges from 3 kilograms to 7 kilograms.

On the one hand, in the present invention a rear axle carrier is provided which, along with two longitudinal members aligned essentially in the longitudinal direction of the vehicle, now has a single transverse member running essentially in the transverse direction of the vehicle connecting the two longitudinal members to one another and fastened to them. The single transverse member is used instead of the previously customary two transverse members parallel to one another. With the omission of the, or a, second transverse member, there is now provided in this area additional free space which, according to the invention, has a particularly advantageous effect in the area of an input side of a transmission. This is because this available space is able to be used in an optimal manner as storage space or for expanding the interior of the vehicle. Accordingly, a rear axle carrier according to the invention only comprises a single, viewed in the direction of motion, preferably rear transverse member on which the transmission on the output side, i.e. in the area of its transmission outputs, is suspended. On the input side, i.e. in the area of the input of the Cardan shaft coming from the drive assembly disposed in the front area of the vehicle, the transmission is mounted according to the invention directly on the floor panel structure of the vehicle body. The two longitudinal members extend, viewed in the transverse direction of the vehicle, preferably over this mounting area and to the front in the direction of motion of the vehicle. But along with this, deviating from the prior art, here the two longitudinal members are not connected to one another by an (additional) transverse member. Thus there are, as concerns the accordingly configured rear axle carrier, with its two longitudinal members, further adequate possibilities for fastening wheel control arms. The additional free space provided by the omission of a transverse member is particularly large when one omits the transverse member further removed from the transmission's drive shafts leading to the vehicle wheels to be driven. As a rule, that is the rear axle carrier's front transverse member, as viewed in the direction of motion. As the single transverse member of a rear axle carrier according to the invention, the one near to the drive shafts of the transmission remains so that this transmission on its output side continues in a proven manner to be able to be mounted on, or fastened to, this transverse member and therefore on the rear axle carrier.

On the input side, i.e. in the flange area of the Cardan shaft, the transmission is then, for lack of a transverse member, fastened to the floor panel structure of the vehicle body. In order to prevent higher-frequency vibrations emitted by the transmission or its toothing from reaching into the vehicle body via this fastening, a serial connection of two elastic bearings with a mass body lying between these bearings is provided according to the invention. This mass body is therefore mounted, both with respect to the vehicle body or its floor panel structure and to the transmission, elastically, i.e. with interposition or inclusion of rubber layer elements. And, the mass body is designed with the aim of selectively including a mass which has or produces a weight lying in a certain higher range between the housing of the transmission and its suspension on the vehicle body. It is as a function of the value of the critical higher-frequency vibrations of the transmission, which customarily lie in the range 400-600 Hertz, that this weight is chosen, preferably being able to lie in the range from 3 to 7 kilograms.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
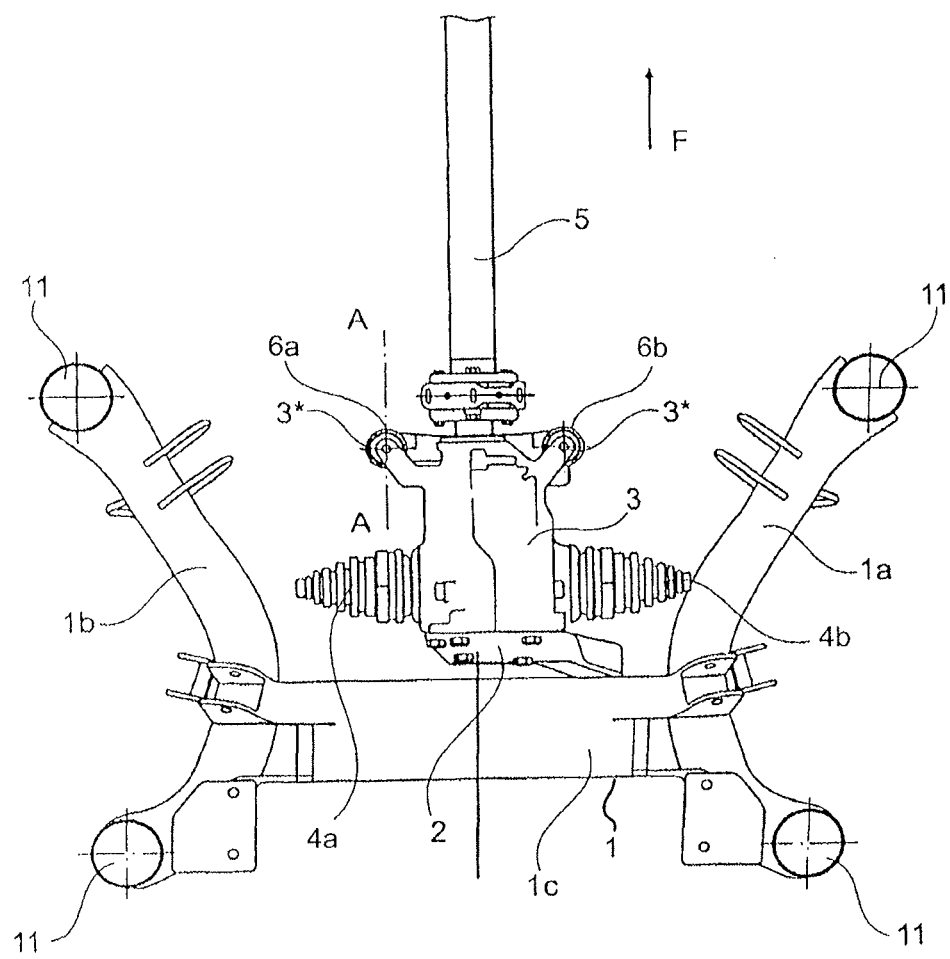
FIG. 1 is a view from below of a rear axle carrier according to the invention and with a transmission of a passenger vehicle.

First, in reference to FIG. 1, reference number 1 denotes a passenger vehicle's rear axle carrier which, according to the invention, is constructed from two longitudinal members 1a, 1b running mirror-symmetrically to one another and aligned essentially with the longitudinal direction of the vehicle and a transverse member 1c connecting these two longitudinal members 1a, 1b and running in the transverse direction of the vehicle. Among other things, on this transverse member 1c and via a supporting arm 2, a transmission 3 is mounted on whose two outputs two articulated shafts 4a (as the articulated shaft on the left when viewed in the direction of motion F of the vehicle) and 4b (as the articulated shaft on the right) represented only in rudimentary form are flange-mounted. The supporting arm 2 is located, as can be seen when viewed in the direction of motion F, in front of the transverse member 1c.

Figure 2:
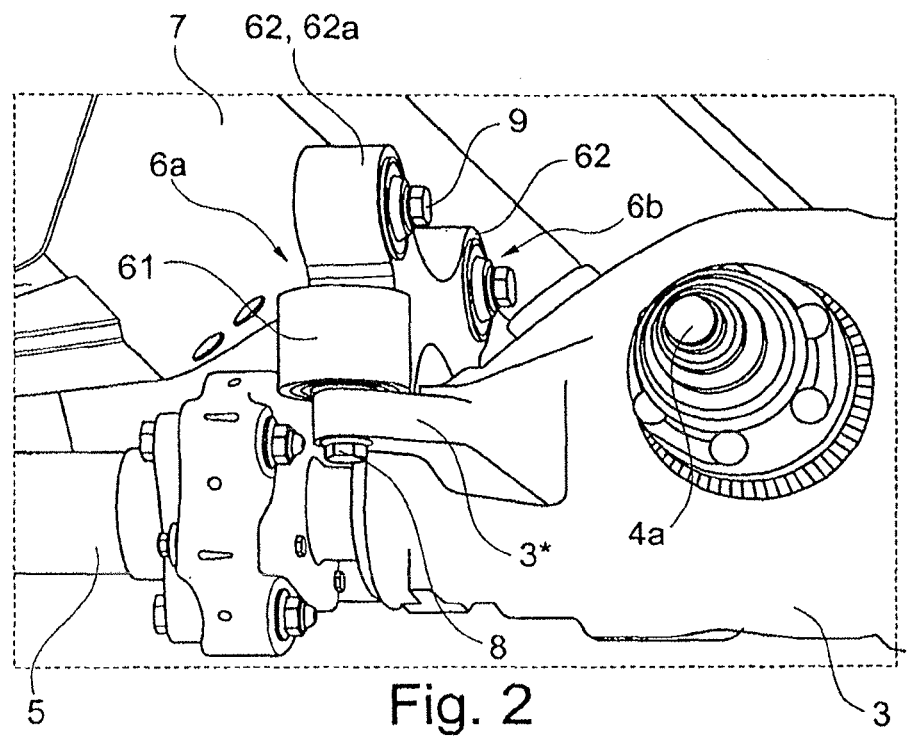
FIG. 2 is a perspective view of the transmission-input-side mounting of the transmission on the floor panel structure of the vehicle body.
Figure 3:
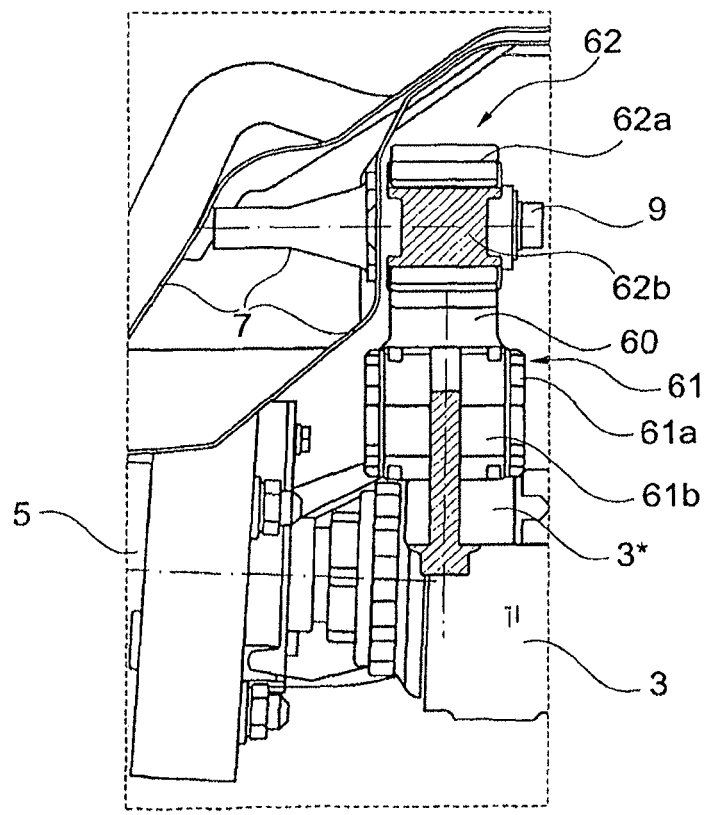
FIG. 3 is a cross-section taken along section A-A from FIG. 1.

On the input side of the transmission 3, as usual, a Cardan shaft 5 is flange-mounted. In the area of its input side, the transmission 3 is fastened to the floor panel structure 7 of the vehicle body via two connecting points 6a, 6b which lie side-by-side in the transverse direction of the vehicle or in tandem when viewed in the transverse direction of the vehicle, as is shown in detail by FIGS. 2 and 3 which are explained in the following.

Each connecting point 6a or 6b is formed by a serial connection of two elastic bearings 61, 62 between which a mass body 60 is disposed, which is configured in such a manner that for the two side-by-side connecting points 6a, 6b, a common mass body 60 is provided. As shown in particular in FIG. 3, a lower elastic bearing 61, which lies nearer to the driving surface and consists of a cylindrical bearing sleeve 61a and disposed within it an elastomer body 61b, is flange-mounted on a flange 3* by means of a screw 8 aligned vertically and drawing the elastomer body 61b against the flange 3* of the transmission 3. The bearing sleeve 61a of this bearing 61 is fixedly connected to the mass body 60 or is a component of the same.

Essentially in the vertical direction above the lower bearing 61, for each connecting point 6a, 6b, an additional upper elastic bearing 62 is provided which is constructed similarly to the lower bearing 61, namely consisting of, fixedly connected to or a part of a mass body 60, a bearing sleeve 62a within which an elastomer body 62b is disposed which is fastened by way of a screw 9 to the floor panel structure 7 of the vehicle body. In connection with this, in the present case this upper bearing 62 is formed in such a manner that the screw 9 is aligned in the longitudinal direction of the vehicle (but this is not absolutely necessary). Along with this, the floor panel structure 7 of the vehicle body in the fastening area of this screw 9 is formed with reinforcement in such a manner that via the two screws 9 of the two connecting points 6a, 6b, together with the connection of the transmission 3 via the supporting arm 2 on the transverse member 1c of the rear axle carrier 1, the transmission 3 is securely fastened to the vehicle body. As described above, via the special configuration of the connecting points 6a, 6b, disturbing vibrations, and thus noises, from the transmission 3 are prevented from reaching into the body of the vehicle. With regard to the mounting of the transmission 3 on the rear axle carrier 1, this is realized vis-à-vis the floor panel structure of the vehicle body in the customary manner via an elastic mounting of the supporting arm 2 on the transverse member 1c and via the also customary elastic mounting of the rear axle carrier 1 at the four bearing points 11 provided at the ends of the two longitudinal members 1a, 1b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A transmission mount for a transmission in a rear region of a passenger vehicle, comprising:
   a vehicle body having a floor panel structure;
   a rear axle carrier comprising two longitudinal members extending essentially in a longitudinal direction of the vehicle body and only one transverse member extending essentially in a transverse direction of the vehicle body;
   two elastic bearings having a mass body between said two elastic bearings, wherein
   an output side of the transmission is mounted on the transverse member of the rear axle carrier,
   an input side of the transmission is fastened to the floor panel structure via a serial connection comprising the two elastic bearings with the mass body therebetween.

2. The transmission mount according to claim 1, further comprising:
   an additional two elastic bearings having a mass body therebetween, wherein the mass body of the two elastic bearings and of the two additional elastic bearings comprises a common mass body;
   wherein the transmission is fastened to the floor panel structure at two connection points, said connection points lying side-by-side essentially in the transverse direction of the vehicle body and being formed by two serial connections of the two elastic bearings and the two additional elastic bearings, respectively.

3. The transmission mount according to claim 1, wherein a weight of the mass body is between 3 kilograms to 7 kilograms.

4. The transmission mount according to claim 2, wherein a weight of the mass body is between 3 kilograms to 7 kilograms.

* * * * *